US011630275B2

(12) United States Patent
Hudson, II et al.

(10) Patent No.: US 11,630,275 B2
(45) Date of Patent: Apr. 18, 2023

(54) FIRE RESISTANT CABLE HAVING TWO JACKETS SEPARATED BY POROUS INSULATING LAYER

(71) Applicant: CORNING RESEARCH & DEVELOPMENT CORPORATION, Corning, NY (US)

(72) Inventors: Harold Edward Hudson, II, Conover, NC (US); William Carl Hurley, Hickory, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 17/895,471

(22) Filed: Aug. 25, 2022

(65) Prior Publication Data

US 2022/0404572 A1 Dec. 22, 2022

Related U.S. Application Data

(63) Continuation of application No. 17/158,460, filed on Jan. 26, 2021, now Pat. No. 11,448,841, which is a
(Continued)

(51) Int. Cl.
*G02B 6/44* (2006.01)
(52) U.S. Cl.
CPC ........... *G02B 6/4436* (2013.01); *G02B 6/443* (2013.01); *G02B 6/4434* (2013.01); *G02B 6/4486* (2013.01)
(58) Field of Classification Search
None
See application file for complete search history.

(56) References Cited

U.S. PATENT DOCUMENTS 4,941,729 A 7/1990 Hardin et al.
2004/0252954 A1 12/2004 Ginocchio et al.
(Continued)

FOREIGN PATENT DOCUMENTS

CA 2281408 A1 3/2000
CN 204613464 U 9/2015
(Continued)

OTHER PUBLICATIONS

European Patent Application No. 19845564.4, extended European search report, dated Apr. 4, 2022; 10 pages; European Patent Office.
(Continued)

*Primary Examiner* — Michelle R Connelly
(74) *Attorney, Agent, or Firm* — William D. Doyle

(57) ABSTRACT

Embodiments of an optical fiber cable are provided. The optical fiber cable includes an outer jacket, an inner jacket, a porous insulating layer, and at least one optical fiber. The outer jacket has a first thickness between its inner surface and its outer surface. The inner jacket has a second thickness between its inner surface and its outer surface. The inner jacket is disposed within the outer jacket. The porous insulating layer is disposed between the inner jacket and the outer jacket. The porous insulating layer is configured to reduce the transfer of heat to the inner jacket during combustion of the outer jacket. The optical fiber is disposed within the inner jacket. In the optical fiber cable, the first thickness is less than the second thickness, and each of the outer jacket and the inner jacket include at least one flame retardant additive.

20 Claims, 3 Drawing Sheets

Related U.S. Application Data continuation of application No. PCT/US2019/044099, filed on Jul. 30, 2019.

(60) Provisional application No. 62/713,620, filed on Aug. 2, 2018.

(56) References Cited

U.S. PATENT DOCUMENTS

| | | | |
|---|---|---|---|
| 2009/0087154 A1* | 4/2009 | Bradley | G02B 6/4401 385/113 |
| 2013/0170800 A1 | 7/2013 | Consonni et al. | |
| 2015/0131952 A1 | 5/2015 | Gallo et al. | |
| 2016/0011389 A1 | 1/2016 | Ly et al. | |
| 2016/0306129 A1 | 10/2016 | Hurley et al. | |

FOREIGN PATENT DOCUMENTS

| | | |
|---|---|---|
| JP | 2006-050713 A | 2/2006 |
| WO | 2017/027283 A1 | 2/2017 |

OTHER PUBLICATIONS

International Search Report and Written Opinion of the International Searching Authority; PCT/US19/044099; dated Oct. 28, 2019; 8 Pages; Commissioner for Patent.

* cited by examiner

FIRE RESISTANT CABLE HAVING TWO JACKETS SEPARATED BY POROUS INSULATING LAYER

CROSS-REFERENCE TO RELATED APPLICATIONS

This application is a continuation of U.S. patent application Ser. No. 17/158,460 filed Jan. 26, 2021, which is a continuation of International Application No. PCT/US2019/044099 filed on Jul. 30, 2019, which claims the benefit of priority to U.S. Provisional Application Ser. No. 62/713,620 filed on Aug. 2, 2018, the content of each of which is relied upon and incorporated herein by reference in its entirety.

BACKGROUND

The disclosure relates generally to a flame retardant cable and more particularly to a cable jacket structure designed to improve flame retardant properties of an optical fiber cable. Flame retardant materials are used to protect combustible materials, such as plastics or wood, from fire damage and heat. Additionally, flame retardant materials have been used to protect materials, such as steel, that lose their strength when exposed to high temperatures. The way in which the flame retardant materials are deployed may affect their flame retardant properties.

SUMMARY

In one aspect, embodiments of the present disclosure relate to an optical fiber cable. The optical fiber cable includes an outer jacket, an inner jacket, a porous insulating layer, and at least one optical fiber. The outer jacket has a first inner surface and a first outer surface. The first outer surface defines an outermost surface of the optical fiber cable. Further, the outer jacket has a first thickness between the first inner surface and the first outer surface. The inner jacket has a second inner surface and a second outer surface and has a second thickness between the second inner surface and the second outer surface. The inner jacket is disposed within the outer jacket. The porous insulating layer is disposed between the second outer surface of the inner jacket and the first inner surface of the outer jacket. The porous insulating layer is configured to reduce the transfer of heat to the inner jacket during combustion of the outer jacket. The at least one optical fiber is disposed within the inner jacket. In the optical fiber cable, the first thickness is less than the second thickness, and each of the outer jacket and the inner jacket include at least one flame retardant additive.

In another aspect, embodiments of the present disclosure relate to a method of preparing a flame retardant optical fiber cable. In the method, a first jacket having a first thickness is extruded over an optical fiber cable core including at least one optical fiber disposed within a buffer tube. A porous insulating layer is applied over the first jacket. Then, a second jacket is extruded over the insulating layer. The second jacket has a second thickness that is no more than half the first thickness, and the second jacket defines the outermost surface of the flame retardant optical fiber cable. The first jacket and the second jacket each include at least one flame retardant additive.

Additional features and advantages will be set forth in the detailed description that follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and the operation of the various embodiments.

DETAILED DESCRIPTION

Various embodiments of an optical fiber cable structure are provided in which the optical fiber cable includes two jacket layers of different thicknesses that are separated by an insulating layer. In particular, the optical fiber cable has an inner jacket and an outer jacket in which the inner jacket is thicker than the outer jacket. The inner and outer jacket include a flame retardant additive, such as aluminum trihydrate or magnesium hydroxide, and because the inner jacket is thicker, the inner jacket contains more total flame retardant additive per meter of cable than the outer jacket. In an optical fiber cable constructed in this way, the flame retardant additive will more gradually decompose during burning so as to release water over an extended period of time, which decreases the total heat release, peak heat release, and flame spread of an optical fiber cable tested according to EN 50399, the European Standard for the reaction to fire test. In contrast to conventional flame retardant optical fiber cables in which the emphasis is on the selection and optimization of the flame retardant additive, cables made according to the present disclosure are directed to the structure of the cable, which addresses the way in which the flame retardant additive is consumed during combustion. The embodiments of the optical fiber cable disclosed herein are provided by way of example and not by way of limitation.

Figure 1:
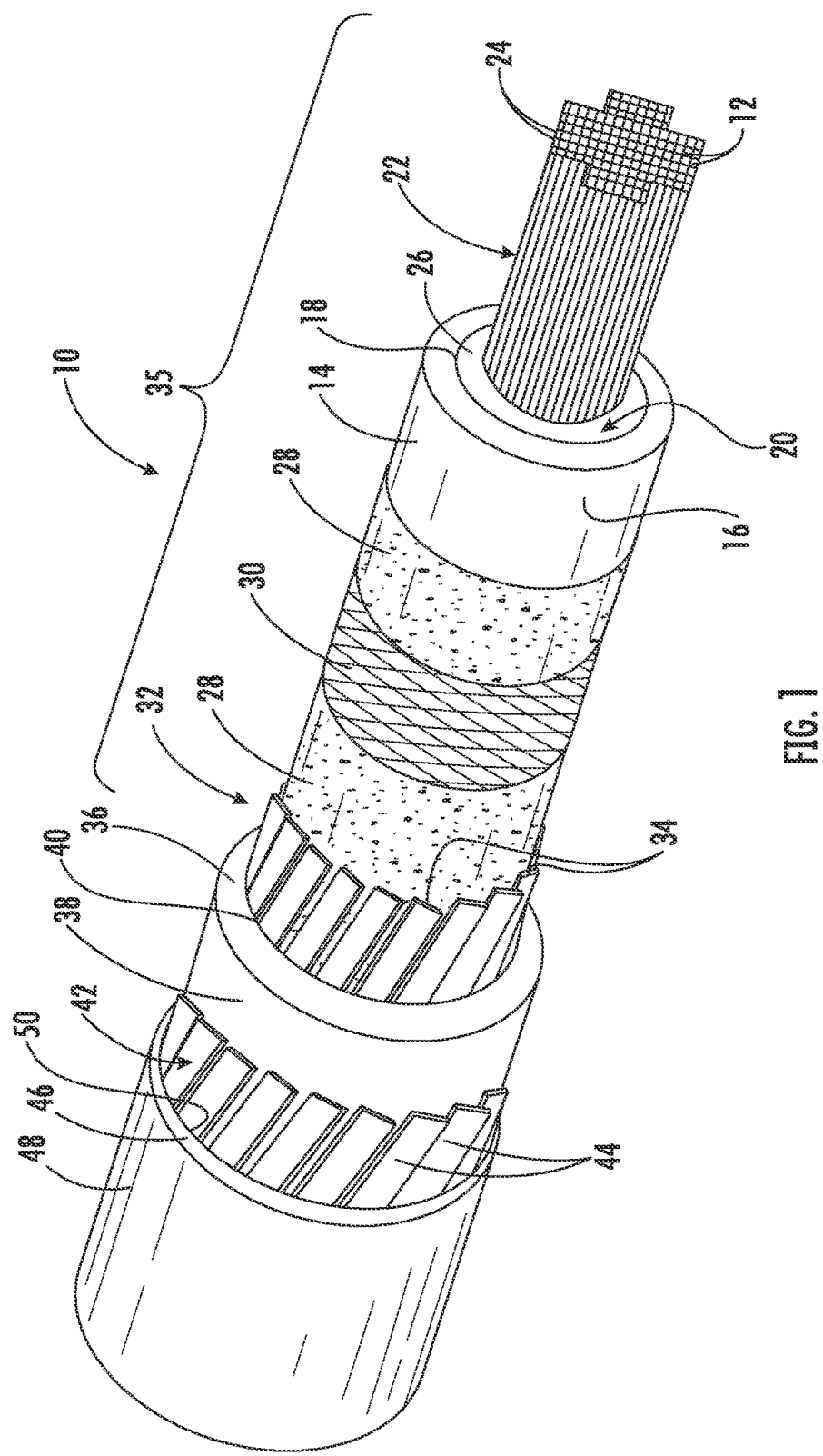
FIG. 1 depicts an optical fiber cable having a thicker, inner jacket and a thinner, outer jacket separated by an insulating layer, according to an exemplary embodiment.

FIG. 1 depicts an embodiment of a flame retardant optical fiber cable 10 including a plurality of optical fibers 12 disposed within a buffer tube 14. The buffer tube 14 includes an exterior surface 16 and an interior surface 18, and as compared to the jacket layers discussed in more detail below, the buffer tube 14 generally does not contain a flame retardant additive, has a lesser thickness, and may have a different composition. The interior surface 18 defines a bore 20 in which the optical fibers 12 are disposed. In the embodiment shown in FIG. 1, the optical fibers 12 are arranged within the bore 20 in a stack 22 of optical fiber ribbons 24. In embodiments, the stack 22 may contain at least 432 optical fibers 12. In other embodiments, the stack 22 may contain at least 864 optical fibers 12. In embodiments, the stack 22 is surrounded by a water blocking gel 26, which helps prevent water migration along the length of the bore 20 and into electrical equipment to which the optical fiber cable 10 might be attached. Other materials, such as super absorbent polymers that swell to fill the bore 20 and block water migration, may be used in addition to or in lieu of the water blocking gel 26.

In embodiments, one or more layers of water blocking tape 28 and/or flame retardant tape 30 surround the outer surface 16 of the buffer tube 14. In embodiments, suitable examples of materials that can be used for the flame retardant tape include mica tape, fiberglass yarn, metal foils (e.g., aluminum, copper, silver, and/or stainless steel), and polyimide films, such as poly(4,4'-oxydiphenylene-pyromellitimide) (commercially known as KAPTON®, available from E. I. du Pont de Nemours and Company). In the embodiment depicted in FIG. 1, the buffer tube 14 is surrounded by a first layer of water blocking tape 28, followed by a layer of flame retardant tape 30, and then a second layer of water blocking tape 28. As with the water blocking gel 26 on the interior of the buffer tube 14, the water blocking tape 28 on the exterior of the buffer tube 14 helps prevent water migration along the length of the optical fiber cable 10 that could result from water infiltration. The flame retardant tape 30 provides insulation against heat from a fire that could cause ignition of components of the optical fiber cable 10 and helps reduce the spread of flames when the optical fiber cable 10 is exposed to fire by creating an oxygen barrier, which limits the rate of the combustion reaction.

Also as depicted in the embodiment of FIG. 1, the optical fiber cable 10 includes strengthening layer 32 that provides tensile strength along the length of the optical fiber cable 10. In the embodiment depicted, the strengthening layer 32 is comprised of strands 34 of a strengthening material, such as fiberglass yarn, fiberglass rods, aramid, steel wires, and/or yarns (e.g., basalt yarns) made from mineral wool, glass wool, stone wool, and ceramic fiber wool. In embodiments, the strengthening layer 32 is comprised of from four to twenty strands 34 wound around the underlying layers.

The components described to this point comprise an embodiment a cable core 35 that is disposed within a first, inner flame retardant jacket 36. As will be appreciated by those of ordinary skill in the art, the particular construction of the cable core 35 may vary depending, for example, on the type of optical fiber cable 10, its particular application, its environment, and the number of optical fibers 12 it contains. The inner jacket 36 has an outer surface 38 and an inner surface 40. The inner jacket 36 is extruded or otherwise applied around the cable core 35 such that the inner surface 40 contacts the cable core 35. In embodiments, the inner jacket 36 surrounds the cable core 35 in the circumferential direction and is a continuous and contiguous along the length of the cable 10.

Disposed around the inner jacket 36 is an insulating layer 42. The insulating layer 42 provides insulation against the transfer of heat to the inner jacket 36 during combustion of the optical fiber cable 10. In order to impede the transfer of heat, the insulating layer 42 may, for example, comprise a material having a relatively low thermal conductivity, such as less than 1 W/mK as measured at 25° C. In other embodiments, the insulating layer 42 has a thermal conductivity of less than 0.1 W/mK as measured at 25° C., and in still other embodiments, the insulating layer 42 has a thermal conductivity of less than 0.05 W/mK as measured at 25° C. The insulating layer 42 may also comprise a material that has a high specific heat capacity, e.g., at least 1000 J/kgK, at least 1500 J/kgK, or at least 2000 J/kgK.

Additionally, the insulating layer 42 is selected or applied around the inner jacket 36 so as to be porous such that water generated from the decomposition of the flame retardant additives (discussed below) is able to pass through the insulating layer 42. That is, "a porous insulating layer" is a layer having the thermal insulating properties as described above and also is a layer through which water or water vapor can pass either by virtue of the inherent porosity of the material selected for the insulating layer or by virtue of the way in which the material is formed or applied, e.g., with gaps between strands of insulating material, with slits cut into the insulating material, by loosely weaving or bonding a woven or nonwoven insulating material, etc. Additionally, introducing porosity into a material may enhance the thermal insulating properties of the material, e.g., by increasing the amount of air (which has a thermal conductivity of less than 0.05 W/mK) as measured at 25° C., contained in the layer.

In embodiments, the insulating layer 42 is a plurality of strands 44 wrapped around the inner jacket 36. In embodiments, the strands 44 are comprised of at least one of fiberglass, aramid, or basalt. Further, in embodiments, the insulating layer 42 is comprised of from four to twenty strands 44 wound around the inner jacket 36.

Figure 2:
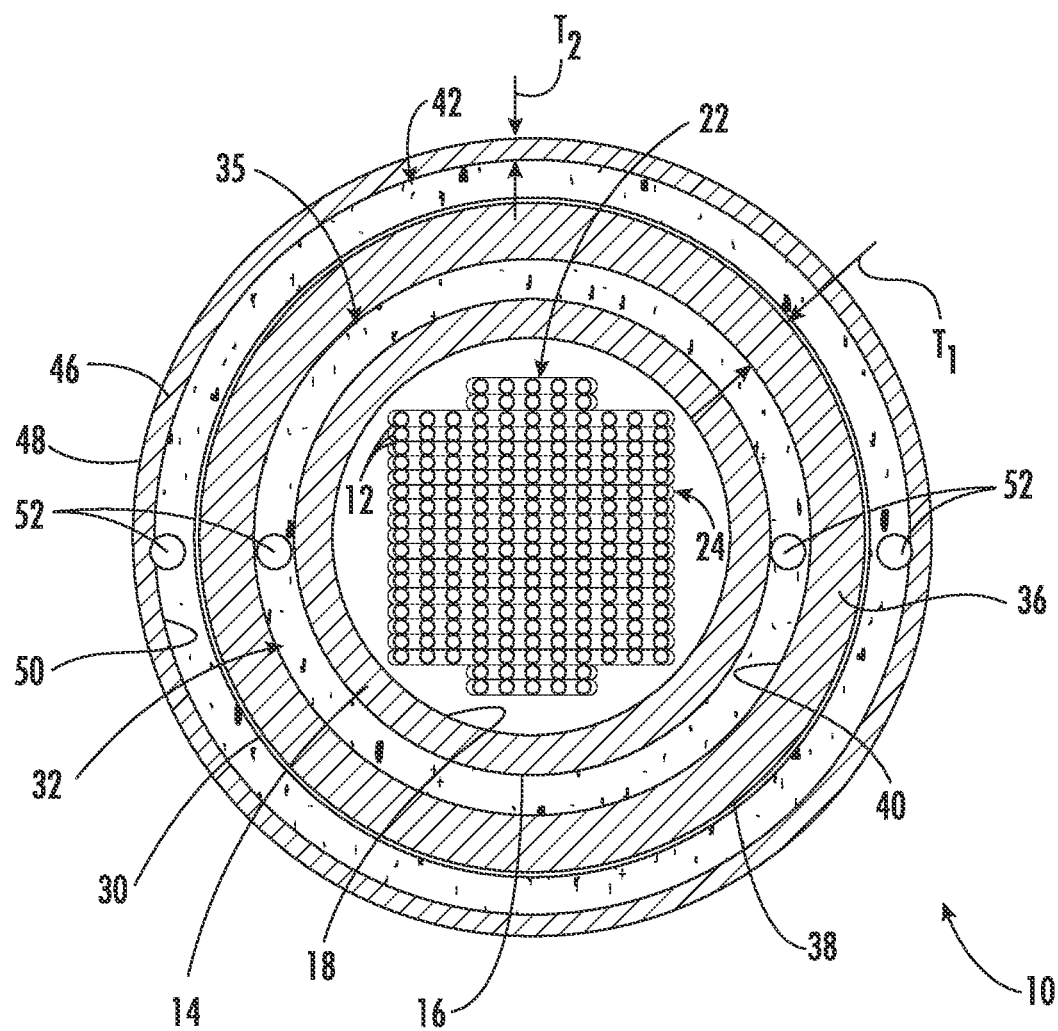
FIG. 2 depicts an optical fiber cable similar to the optical fiber cable of FIG. 1 with an additional layer of mica tape, according to an exemplary embodiment.

Disposed outside of the insulating layer 42 is an outer jacket 46. The outer jacket 46 has an outer surface 48 that defines the outermost extent of the optical fiber cable 10 and an inner surface 50 that contacts the insulating layer 42. In embodiments, the inner jacket 36 surrounds the insulating layer 42, the inner jacket 36, and cable core 35 in the circumferential direction and is a continuous and contiguous along the length of the cable 10. Additionally, the optical fiber cable 10 may include one or more ripcords 52 (as shown in FIG. 2) that allow for access to the interior components of the cable, e.g., to the cable core 35.

In embodiments, the inner jacket 36 and the outer jacket 46 are comprised of a flame retardant additive dispersed, mixed, or otherwise distributed in a polymeric resin. In embodiments, the polymeric resin is a thermoplastic, and in a more specific embodiment, the thermoplastic is a polyolefin-based resin. Polymer resins that may be used for the inner jacket 36 and/or outer jacket 46 include a single polymer or a blend of polymers selected from the following non-limiting list: ethylene-vinyl acetate copolymers, ethylene-acrylate copolymers, ethylene homopolymers (including but not limited to low density, medium density, and high density), linear low density polyethylene, very low density polyethylene, polyolefin elastomer copolymer, propylene homopolymer, polyethylene-polypropylene copolymer, butene- and octene branched copolymers, polyester copolymers, polyethylene terephthalates, polybutylene therephthalates, other polymeric terephthalates, and maleic anhydride-grafted versions of the polymers listed herein. In embodiments, the inner jacket 36 and the outer jacket 46 are made of the same polymer resin, and in other embodiments, the inner jacket 36 and the outer jacket 46 are made of different polymer resins.

As mentioned, the inner jacket 36 and the outer jacket 46 also include at least one flame retardant additive. Exemplary flame retardant additives include metal hydrates and metal hydroxides, such as aluminum trihydrate (ATH) and/or magnesium dihydroxide (MDH). ATH and MDH, in particular, operate as flame retardant additives by endothermically decomposing between about 200° C. and about 300° C. to release water. The endothermic reaction absorbs heat, and the release of water helps put out flames and cool the temperature of the fire. Additionally, the ATH and MDH can promote char formation, which helps remove potential fuel from the combustion reaction.

In embodiments, the flame retardant additive comprises from 10 wt % to 65 wt % of the composition of the inner jacket 36 and/or the outer jacket 46. In other embodiments, the flame retardant additive comprises from 25 wt % to 55 wt % of the composition of the inner jacket 36 and/or outer jacket 46. In a more specific embodiment, the flame retardant additive comprises from 35 wt % to 50 wt % of the composition of the inner jacket 36 and/or outer jacket 46. In embodiments, the inner jacket 36 and the outer jacket 46 comprise the same weight percentages of the flame retardant additive, and in other embodiments, the inner jacket 36 and the outer jacket 46 comprise different weight percentages of the flame retardant additive. Further, in embodiments, the inner jacket 36 and the outer jacket 46 may comprise the same or different type of flame retardant additive.

The inner jacket 36 and outer jacket 46 may also include non-flame retardant additives typically used in polymer processing, such as mineral fillers (talc, calcium carbonate, etc.), antioxidants, UV additives, processing modifiers, compatibilizers, and/or other standard polymer additives.

As can be seen in the embodiment shown in FIG. 2 (in which like numerals indicate like structures), the inner jacket 36 has a first thickness $T_1$, between the outer surface 38 and the inner surface 40, and the outer jacket 46 has a second thickness $T_2$ between the outer surface 48 and the inner surface 50. The first thickness $T_1$ is greater than the second thickness $T_2$, which is contrary to conventional cable design in which the outermost jacket is the thickest to provide mechanical robustness. In embodiments, the first thickness $T_1$ is at least twice the second thickness $T_2$. In embodiments, the first thickness $T_1$ is from 1 mm to 5 mm. In other embodiments, the first thickness $T_1$ is from 2 mm to 4 mm, and in still other embodiments, the first thickness $T_1$ is from 2 mm to 3 mm. In embodiments, the second thickness $T_2$ is from 0.3 mm to 2 mm. In other embodiments, the second thickness $T_2$ is from 0.4 mm to 1.5 mm, and in still other embodiments, the second thickness $T_2$ is from 0.5 mm to 1 mm.

In general, an optical fiber cable 10 constructed as described above exhibits enhanced performance in terms of peak heat release rate (PHRR), total heat release (THR), and flame spread (FS) as measured according to EN 50399. THR relates to the energy released during combustion of the optical fiber cable 10, and PHRR relates to the power or intensity of the heat released from the burning cables. In certain conventional cables having a single jacket around the cable core, better performance could be achieved under this standard by increasing the thickness of the jacket material because increasing the thickness increases the total amount of flame retardant additive available to counteract the flame/heat. However, this approach has limiting returns because the flame retardant additive may be quickly consumed.

According to the embodiments described herein, the optical fiber cables 10 have two jackets 36, 46 instead of one, and these jackets 36, 46 are separated by a porous insulting layer 42. In this way, the flame retardant additives in the outer jacket 46 are consumed prior to the flame retardant additives in the inner jacket 36. Accordingly, there is a more gradual decomposition of the flame retardant additives when exposed to flame/heat so as to limit THR and PHRR, which ultimately also leads to a reduced FS. In this way, embodiments of the optical fiber cable 10 as disclosed herein are classified as Class $B2_{ca}$ or Class $C_{ca}$ according to the EN 50399 reaction to fire test. The classifications according to EN 50399 for Class $B2_{ca}$ and $C_{ca}$ are provided in Table 1, below.

TABLE 1

| Requirements for EN 50399 Classifications $B2_{ca}$ and $C_{ca}$ | | |
|---|---|---|
| Classification | Class $B2_{ca}$ | Class $C_{ca}$ |
| FS (m) | ≤1.5 | ≤2.0 |
| PHRR (kW) | ≤30 | ≤60 |
| THR (MJ) | ≤15 | ≤30 |

Additionally, as can be seen in FIG. 2, embodiments of the optical fiber cable 10 also include a layer of flame retardant tape 30 (such as one of the flame retardant tapes 30 listed above) between the insulating layer 42 and the outer surface 38 of the inner jacket 36. The flame retardant tape 30 provides another layer of insulation between the inner jacket 36 and the outer jacket 46 as well as an oxygen barrier to slow the rate of the combustion reaction. Further, as will be demonstrated below, the flame retardant tape 30 helps to reduce flame spread.

Figure 3:
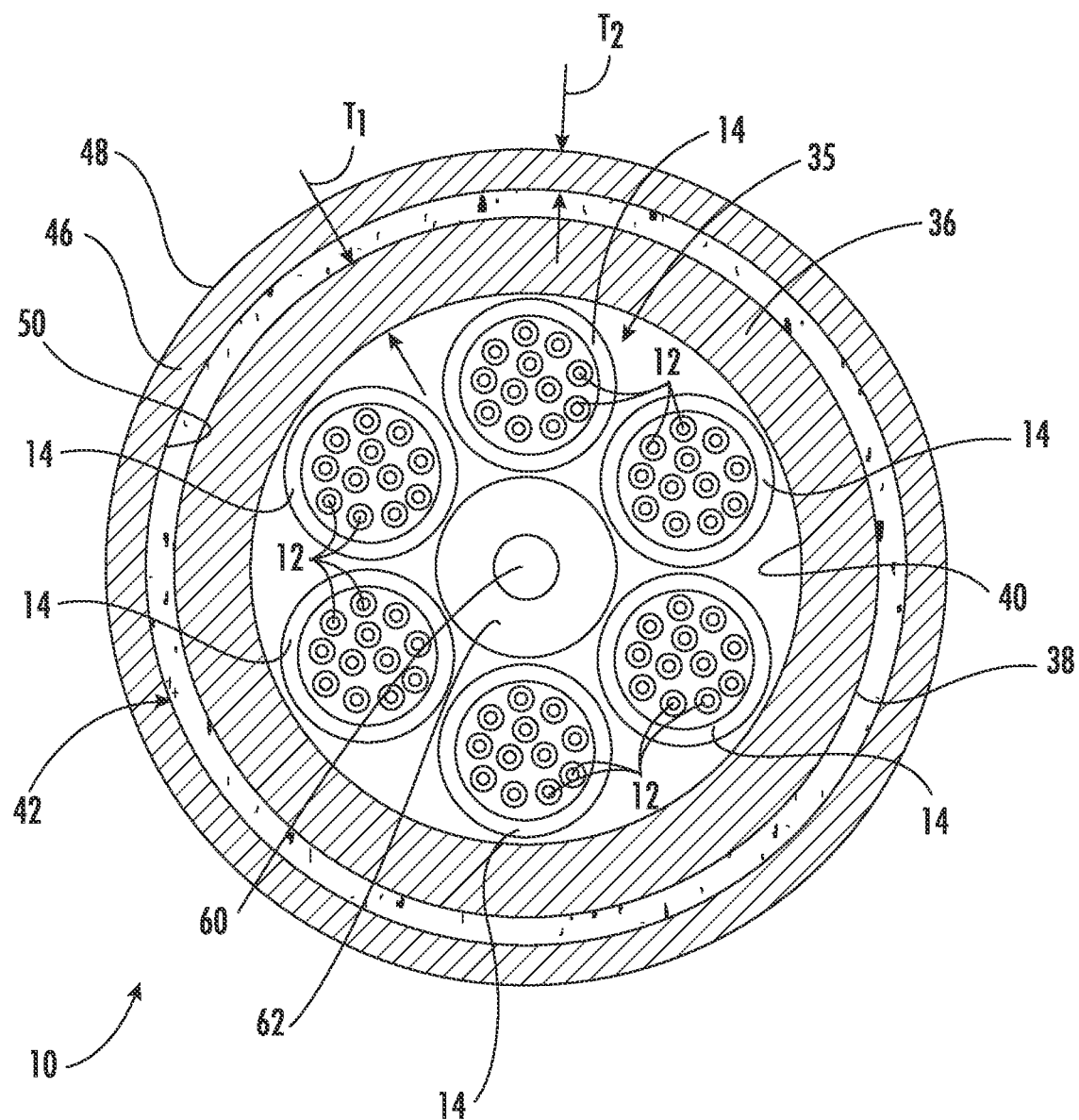
FIG. 3 depicts another embodiment of an optical fiber cable including a plurality of buffer tubes stranded around a central strength member, according to an exemplary embodiment.

In still another embodiment shown in FIG. 3 (in which like numerals indicate like structures), the optical fiber cable 10 has cable core 35 in which the optical fibers 12 are arranged in a plurality of buffer tubes 14 stranded around a central strength member 60. The central strength member 60 may be a glass-reinforced plastic rod, a metal rod, aramid, etc. In the embodiment depicted, the central strength member 60 has an upjacket 62 to provide a particular diameter suitable for stranding the desired number of buffer tubes 14 around the central strength member 60 to provide a cable core 35 having a desired number of optical fibers. As in the previous embodiments, the inner jacket 36 is extruded around the cable core 35, and the insulating layer 42 is provided around the inner jacket 36. In embodiments, a layer of flame retardant tape 30 is also provided around inner jacket 36. Also, as with the previous embodiments, the outer jacket 46 is extruded around the insulating layer 42.

EXAMPLES

Four optical fiber cables were made having a single jacket, and three optical fiber cables were made having the inner jacket and outer jacket separated by an insulating layer as described above. The first three optical fiber cables had the same cable core, which included a central tube cable with 3.0 mm, PC/PBT tubes filled with water-blocking gel. The diameter of the cable core 35 for Cables 1, 2, and 3 was 4.4 mm. Cable 1 had a 0.9 mm thick single jacket; Cable 2 had a 1.2 mm thick single jacket; and Cable 3 had a 1.6 mm thick single jacket. The jacket material was polyolefin-based with about 60% ATH.

Cables 4-7 all included 864-fiber ribbon cables with 17.9 mm buffer tubes. The diameter of the cable core 35 for Cables 4-7 was 20.4 mm. The jacket material was polyolefin-based with about 60% MDH. Cable 4 had a 3.0 mm thick single jacket. Cable 5 included a 2.5 mm inner jacket 36, an insulating layer 42 of fiberglass yarns, and a 1.0 mm outer jacket 46. Cable 6 was substantially the same as Cable 5 except that it included a layer of mica tape 30 between the inner jacket 36 and the insulating layer 42. With respect to Cable 6, the ability of the mica tape 30 to form an oxygen barrier that is intended to reduce the rate of combustion by limiting the rate at which oxygen reaches the cable core 35 is balanced against the consequence of also forming a vapor barrier which hinders water from being transported through the mica tape from the inner jacket 36. Cable 7 included a 2.5 mm inner jacket 36, an insulating layer 42 of fiberglass yarns, and a 2.0 mm outer jacket 46. These cables were burned according to the EN 50399 test, and the results are shown in Table 2.

TABLE 2

Results of EN 50399 Testing of Cables 1-7

| Cable | Jacket Structure | Total Heat Release (MJ) | Peak Heat Release Rate (kW) | Flame Spread (m) |
|---|---|---|---|---|
| Cable 1 | 0.9 mm single jacket | 56 | 327 | 3.0 |
| Cable 2 | 1.2 mm single jacket | 61 | 320 | 3.3 |
| Cable 3 | 1.6 mm single jacket | 66 | 331 | 3.3 |
| Cable 4 | 3.0 mm single jacket | 23.2 | 48.1 | 1.32 |
| Cable 5 | 2.5 mm inner jacket, insulating layer, 1.0 mm outer jacket | 10.4 | 28.0 | 1.10 |
| Cable 6 | 2.5 mm inner jacket, mica tape, insulating layer, 1.0 mm outer jacket, | 11.1 | 31.7 | 0.91 |
| Cable 7 | 2.5 mm inner jacket, insulating layer, 2.0 mm outer jacket | 12.5 | 27.6 | 0.93 |

As can be seen, Cables 1-3 all have significantly higher THR, PHRR, and FS than Cables 4-7 even though Cables 1-3 are smaller cables. The cable jacket is intended to provide protection to the cable core, and the inventors surmised that a thicker jacket would be expected to provide more protection than a thinner jacket. During experimentation, it was found that, once the flame retardants are consumed, the rest of the jacket material becomes fuel for the fire. The results in Table 2 for Cables 1-3 demonstrate that increasing the jacket thickness resulted in increasing the THR for the cable.

Surprisingly, though, Cables 4-7 performed still much better than Cables 1-3 even though they are larger cables that would seem to have more fuel in the cable core 35. Cable 4 has a very thick, single jacket and succeeded in meeting EN 50399 requirements for a Class $C_{ca}$ rating providing in Table 1, above; however, it did not meet the requirements for Class $B2_{ca}$ as also provided in Table 1, above. In this regard, each of Cables 5-7 had a better THR, PHRR, and FS than Cable 4.

Of Cables 5-7, Cable 7 had the highest THR at 12.5 MJ, the lowest PHRR at 27.6 kW, and the second lowest FS at 0.93 m. Cable 5 had the lowest THR at 10.4 MJ, the second lowest PHRR at 28.0 kW, and the highest flame spread at 1.10 m. Cable 6 had the second lowest THR at 11.1 MJ, the highest PHRR at 31.7 kW, and the lowest FS at 0.91 m. The results of Cable 5 and Cable 7 show that increasing the thickness $T_2$ of the outer jacket 46 tends to lead to an increase in THR (similar to the results of Cables 1-3). The results of Cable 5 and 6 illustrate the effect of adding a layer of mica tape between the inner jacket 36 and the outer jacket 46. The mica tape helps reduce FS, but tends to cause an increase in THR on account of the vapor barrier effect described above. Ultimately, Cable 6 would be classified as Class $C_{ca}$ because of the PHRR above 30 kW. Thus, it can be seen that, the thickness $T_2$ of the outer jacket 46 thickness and/or the inclusion of a flame retardant tape 30 in the optical fiber cable 10 can be manipulated to address a particular flame retardant characteristic.

As disclosed herein, embodiments of a flame retardant optical fiber cable are provided in which a cable core is surrounded with a thick inner jacket, an insulating layer, and a thin outer jacket, which is contrary to conventional cable design. However, the disclosed cable design provides the advantage that, during combustion, the thin outer jacket burns and produces a char layer on the cable, and because the outer jacket is thin, the THR is kept low during burning. Further, the porous insulating layer between the outer and inner jackets ensures that the inner jacket is heated much more slowly than the outer jacket, which prevents the inner jacket from having a high heat release rate. Furthermore, as the inner jacket is being heated, its flame retardant additives decompose and release water to cool the flame. In this way, the optical fiber cable constructed according to this disclosure is able to achieve a Class B2 or Class C rating during EN 50399 testing.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical fiber cable, comprising:
   an outer jacket having a first inner surface and a first outer surface, the first outer surface defining an outermost surface of the optical fiber cable, and the outer jacket having first thickness between the first inner surface and the first outer surface;
   an inner jacket having a second inner surface and a second outer surface and having a second thickness between the second inner surface and the second outer surface, the inner jacket being disposed within the outer jacket;
   a porous insulating layer disposed between the second outer surface of the inner jacket and the first inner surface of the outer jacket, the porous insulating layer having a thermal conductivity of less than 1 W/mK as measured at 25° C.;
   at least one optical fiber disposed within the inner jacket;
   wherein the first thickness is less than the second thickness; and
   wherein each of the outer jacket and the inner jacket comprise at least one flame retardant additive.

2. The optical fiber cable of claim 1, wherein the first thickness is no more than half the second thickness.

3. The optical fiber cable of claim 1, wherein the first thickness of the outer jacket is from 0.3 mm to 2 mm.

4. The optical fiber cable of claim 3, wherein the second thickness of the inner jacket is from 1 mm to 5 mm.

5. The optical fiber cable of claim 1, wherein the flame retardant additive comprises at least one of aluminum trihydrate or magnesium hydroxide.

6. The optical fiber cable of claim 1, wherein the outer jacket and the inner jacket each comprise the same proportion of the at least one flame retardant additive.

7. The optical fiber cable of claim 1, wherein the outer jacket and the inner jacket each comprise a different proportion of the at least one flame retardant additive.

8. The optical fiber cable of claim 1, wherein the outer jacket and the inner jacket each comprise from 10 wt % to 65 wt % of the at least one flame retardant additive.

9. The optical fiber cable of claim 1, wherein the porous insulating layer comprises a plurality of insulating strands wrapped around the second outer surface of the inner jacket.

10. The optical fiber cable of claim 9, wherein the plurality of strands comprises from four to twenty strands.

11. The optical fiber cable of claim 1, wherein the insulating strands comprise at least one of fiberglass, aramid, or basalt.

12. The optical fiber cable of claim 1, wherein the porous insulating layer comprises a material having a specific heat capacity of at least 1000 J/kgK.

13. The optical fiber cable of claim 1, wherein the at least one optical fiber comprises a plurality of optical fibers arranged in a stack of ribbons, the stack comprising at least 432 optical fibers.

14. The optical fiber cable of claim 1, wherein the at least one optical fiber comprises a first plurality of optical fibers arranged in a second plurality of buffer tubes that are stranded around a central strength member.

15. The optical fiber cable of claim 1, wherein the optical fiber cable is classified in Class $B2_{ca}$ or Class $C_{ca}$ for peak heat release rate, total heat release, and flame spread as tested according to EN 50399.

16. A method of preparing a flame retardant optical fiber cable, comprising the steps of:
 extruding a first jacket having a first thickness over an optical fiber cable core comprising at least one optical fiber disposed within a buffer tube;
 applying a porous insulating layer over the first jacket, wherein the porous insulating layer has a thermal conductivity of less than 1 W/mK as measured at 25° C.; and
 extruding a second jacket over the insulating layer, the second jacket having a second thickness that is no more than half the first thickness and the second jacket defining the outermost surface of the flame retardant optical fiber cable;
 wherein the first jacket and the second jacket each comprise at least one flame retardant additive.

17. The method according to claim 16, further comprising the step of winding a layer of a flame retardant tape around the first jacket prior to the step of applying the insulating layer.

18. The method of claim 16, wherein the step of applying the insulating layer further comprises winding a plurality of strands around the first jacket.

19. The method of claim 18, wherein the plurality of strands comprise at least one of fiberglass, aramid, or basalt.

20. The method of claim 16, wherein the at least one flame retardant additive comprises at least one of alumina trihydrate or magnesium hydroxide.

\* \* \* \* \*